INVENTORS
WILLIAM P. LEAR,
SAMUEL H. AULD.
By R. A. Marsen
their ATTORNEY

INVENTORS
WILLIAM P. LEAR,
SAMUEL H. AULD.
By R.A. Marsen
their ATTORNEY

MULTI-TRACK TAPE CARTRIDGE PLAYER

Filed Aug. 26, 1964 Sheet 3 of 3

INVENTORS
WILLIAM P. LEAR,
SAMUEL H. AULD.
By R.A. Marsen
their ATTORNEY

United States Patent Office 3,437,762

Patented Apr. 8, 1969

3,437,762

MULTI-TRACK TAPE CARTRIDGE PLAYER

William P. Lear and Samuel H. Auld, Wichita, Kans., assignors to Lear Jet Industries, Inc., a corporation of Delaware Filed Aug. 26, 1964, Ser. No. 392,213
Int. Cl. G11b *15/60*
U.S. Cl. 179—100.2 3 Claims

ABSTRACT OF THE DISCLOSURE

The magnetic tape player automatically accommodates multi-track magnetic tape cartridges, such as those containing tape in endless array. A cartridge is readily inserted in the player, and directly engaged in the play mode. The forward exposed portion of its tape is thereupon positioned and maintained at a predetermined level in the player during transport of the tape across the transducer, in play. A series of spaced cam regions actuate the transducer in step-by-step scanning across the tape and return, synchronized with the parallel record-tracks for continuous play of the inserted cartridge.

This invention relates generally to magnetic tape players, and more particularly to novel mechanism for automatically shifting the player head laterally into precise track positions of the tape recordings contained in cartridges insertable in the player.

The present invention is applicable for stereophonic or for monaural multi-track tape recordings. It is useful for systems with endless tape cartridges, or with those requiring tape reversals. The invention hereof is positive and precise in action, and can readily double the recorded playing time as compared to prior art systems. For example, when applied to players of one-quarter inch wide tape, eight individual tracks are practical as against the usual four. Thus, for stereophonic recordings using two tracks simultaneously, a reel that contains a one-half hour program along its full length, can be played for two full hours on the eight tracks hereof on one-quarter inch tape; and for four hours, monaurally.

In accordance with the present invention, the magnetic head is mounted on a displaceable support plate. In the exemplary embodiment, a stepped face cam coacts with a pin extending from the plate to alter the elevation of the head. A fixed tape guide projects into the inserted cartridge to maintain its tape height at a preset level with respect to the cam or chassis base. A conductive strip on the tape, or other suitable means, actuates the stepped cam into its next position, and moves the head to the next track.

When the mechanism is actuated with the head at the last-track location, it directly displaces the head to the first track play position. Such automatic recycling action is particularly useful for endless-tape cartridges, and/or for continuous players. The invention track shifter is also readily manually actuated, step-by-step, through a push-button at the player's front end.

These and further features, advantages and objects of the invention will become more apparent from the following description of an exemplary embodiment thereof, illustrated in the drawings, in which.

Figure 1:
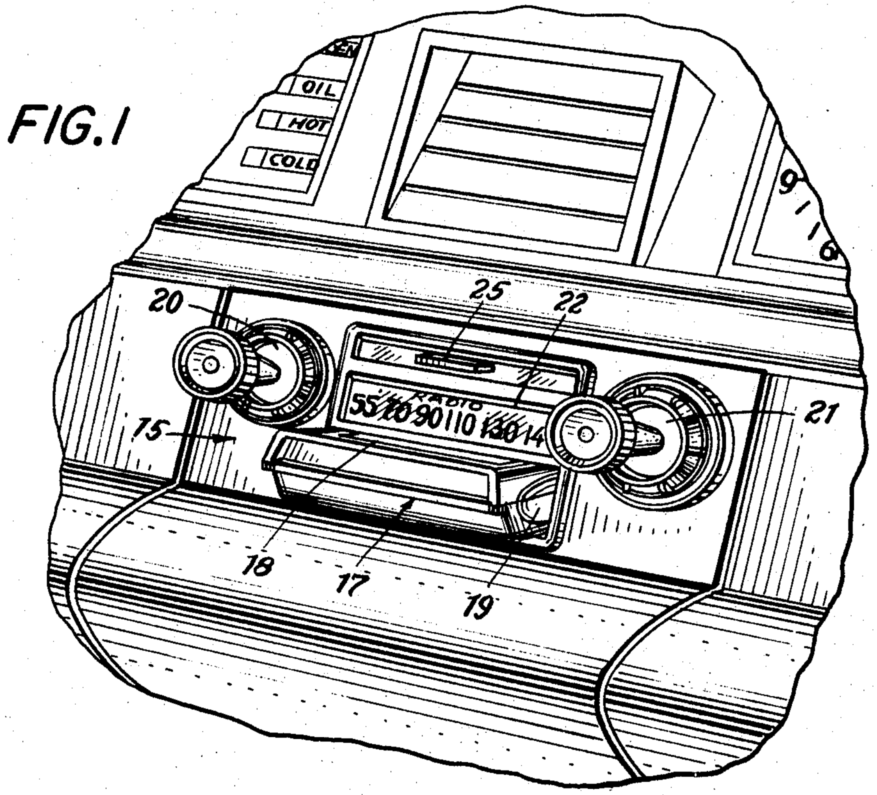
FIG. 1 is an illustration in perspective of the exemplary player, mounted in the dashboard of an automobile.
Figure 2:
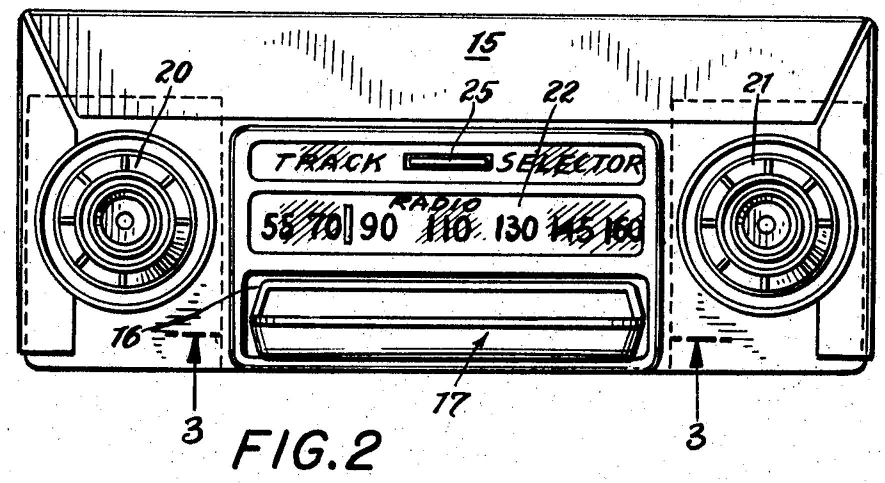
FIG. 2 is a front view of the magnetic player shown in FIG. 1, incorporating the track shift mechanism of the invention.

While the exemplary magnetic tape player shown in FIGS. 1 and 2 is of the cartridge type, and constructed for automobile operation, it is to be understood that the track shifting mechanism of the present invention is more generally applicable, as hereinabove stated. The unit 15 is a combined radio-stereo player of compact array, that is readily fitted behind the automobile dashboard. The player 15 contains a slot or tunnel opening 16 into which an endless tape cartridge 17 is readily inserted for play.

The cartridge 17 has a top finger grip 18, and side ones 19 to facilitate its handling. The control knob sets 20, 21 are used to operate the radio 22 or magnetic player, and for volume, tone and stereo balance settings. The player unit 15 is more fully described in the copending patent application "Combination Radio and Magnetic Cartridge Player," now Patent No. 3,400,227; and the tape cartridge 17 in the copending patent application "Magnetic Tape Cartridge," now Patent No. 3,403,868, both assigned to the same assignee hereof. The operation of the track selector switch 25 is described hereinafter in connection with the track shift mechanism.

Figure 3:
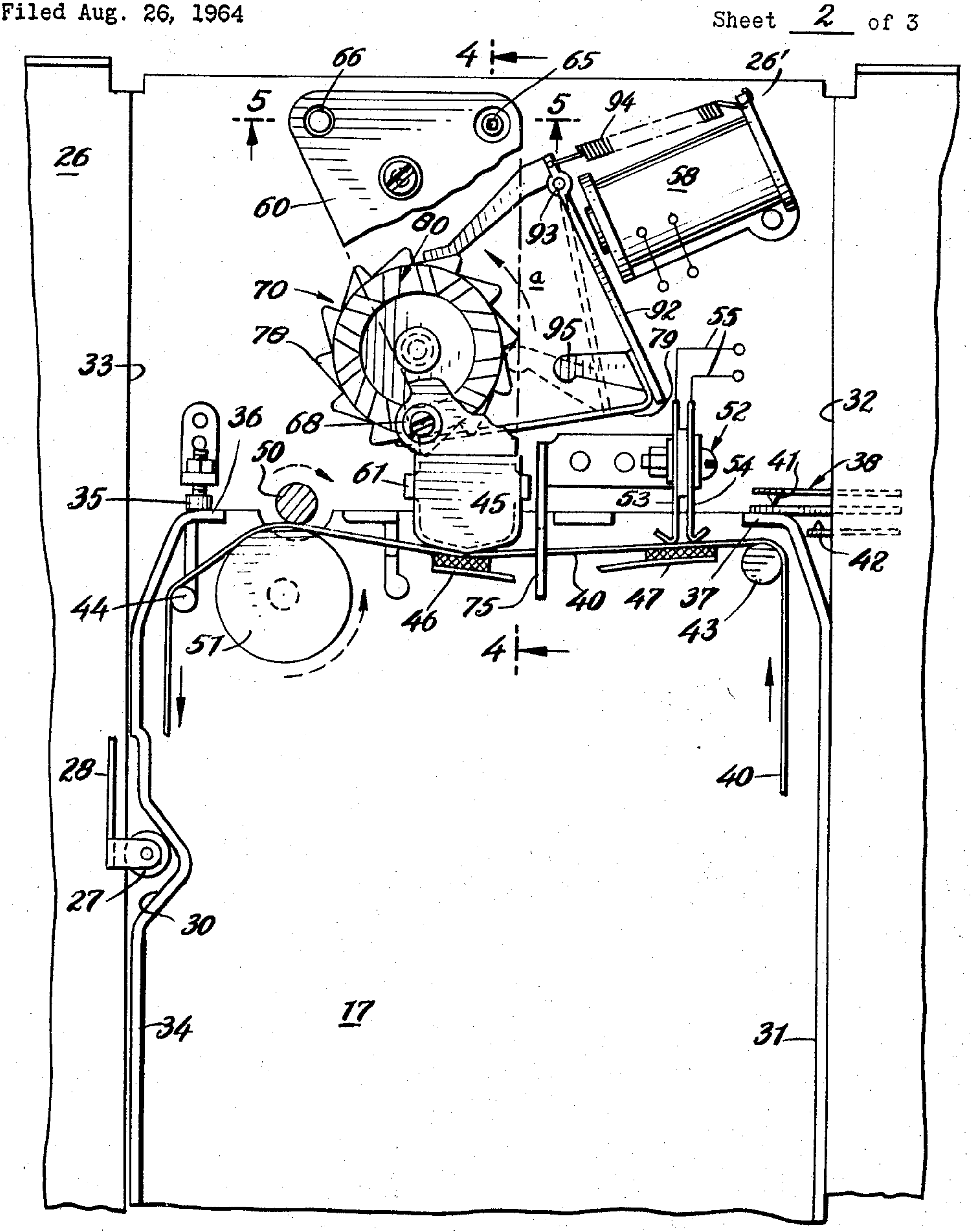
FIG. 3 is an enlarged plan view, from below the chassis interior, of the track shift mechanism hereof and inserted cartridge, as seen along the plane 3—3 as indicated in FIG. 2.

FIG. 3 is a view up from the bottom of the player chassis 26, with the cartridge 17 inserted to the "play" position. A retention roller 27 on leaf spring 28 is pressed into a notch 30 on the side of cartridge 17. The roller 27 presses the cartridge side 31 flush against the coacting chassis face 32 of the slot or tunnel opening. The close fitting of chassis slot face 33 with cartridge side 34 serves to hold the cartridge stably when retained by spring-pressed roller 27. An adjustable mechanical stop 35 abuts forward corner 36 of the cartridge as a safety back-stop for play coaction, to establish the play action of the contained magnetic tape 40 with the magnetic head 45 and the capstan 50 resulting from the forward force exerted by the spring-pressed roller 27 on the inclined wall of notch 30 in the cartridge side 34 as shown in FIG. 3 and as set forth in said copending patent cases.

Electrical switch 38 has an arm 39 that is actuated by the cartridge corner 37 when in the "play" position, as shown. When arm 39 is thus closed on contact 41, the motor control circuit is thereupon energized. The motor shaft or capstan 50 is rotated at a preset constant speed to transport or otherwise operate the magnetic tape 40 at its predetermined linear playing speed, as 3.75 inches per second. The capstan 50 firmly presses tape 40 against pinch roller 51 in its drive relation. When the cartridge 17 is removed from the chassis 26 the switch arm 39 reconnects with lower contact 42. This in turn cuts off the player motor and connects the radio for play, as set forth in the hereinabove said Patent 3,400,227.

Figure 7:
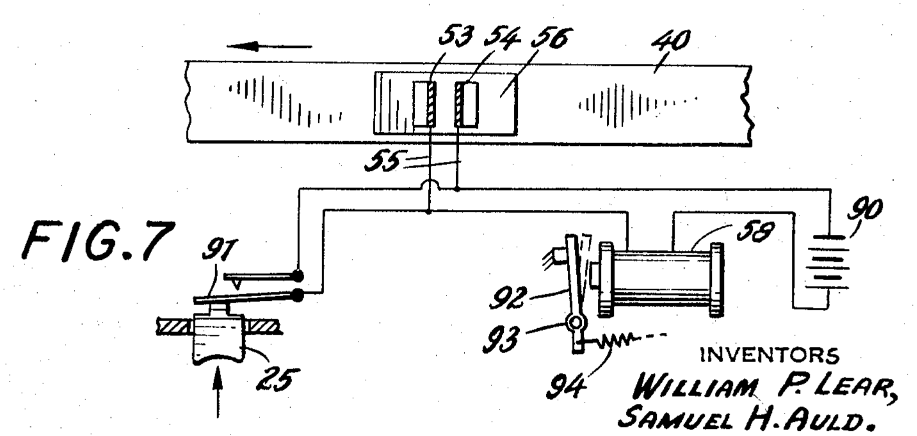
FIG. 7 is a schematic diagram of the manual and automatic electrical actuation circuit of the shift mechanism hereof.

The magnetic tape is guided over corner posts or pins 43, 44, and is stabilized by felt pads 46, 47 lightly pressed to it. Pad 46 holds tape 40 against head 45; pad 47 presses it against contactor 52. Contactor 52 contains two feeler contacts 53, 54 that ride on the tape 40. The contacts are electrically separate and connect with leads 55. The electrical conductivity of the surface of tape 40 is too low to energize the track switching solenoid 58 across contacts 53, 54, as described hereinafter in connection with FIG. 7. A conductive patch secured to track end/start position on tape 40 (or other desired location) will short-circuit contacts 53, 54 and momentarily close the track switching circuit (of FIG. 7). The resultant pulse energization of solenoid 58 acts to shift head 45 to the next track (monaural) or set of tracks (stereo), in the manner now to be described.

Head 45 is firmly secured to support plate 60 by clip arms 61, 61. An electrical plug 62 connects with prongs (not seen) of head 45 to conduct through cable 63 with the play amplifier. Head 45 is a dual unit with two predeterminedly spaced air gaps for pickup of paired stereo tracks on tape 40 (see FIG. 4). The far edge of support 60 contains two apertures that respectively coact with conical posts. Post 66 is secured to chassis 26; post 65 being vertically adjustable through threads and nut 67 fixed to the chassis 26. A threaded pin 68 is held in a threaded aperture of plate 60. The rounded bottom end of pin 68 is arranged to ride on the stepped face cam 70 (see FIG. 4). Pin 68 is preferably made of a tough material, as "Teflon," having low frictional action with metallic cam 70. A spring 71 is held pressed against a central portion of plate 60, to maintain pin 68 and face cam 70 in operative relation. Spring 71 is supported by a 72 held to chassis 26 by a nut 73 secured thereto.

Figure 4:
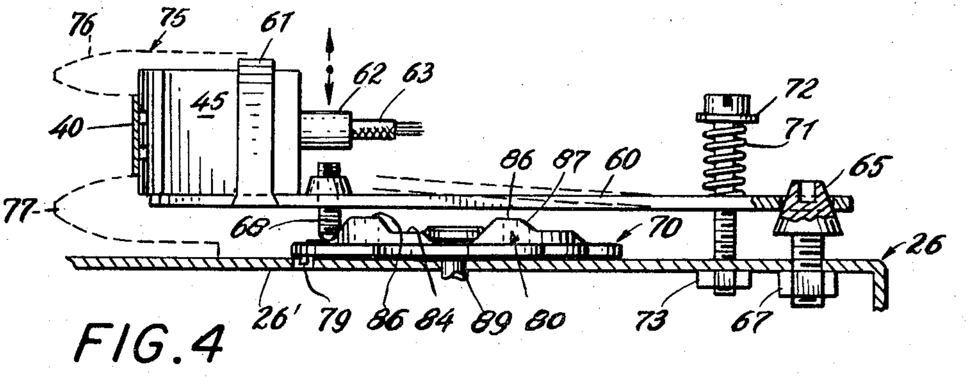
FIG. 4 is an elevational view of the shift mechanism, partly in section, as seen along the line 4—4 in FIG. 3, in the direction of the arrows.
Figure 5:
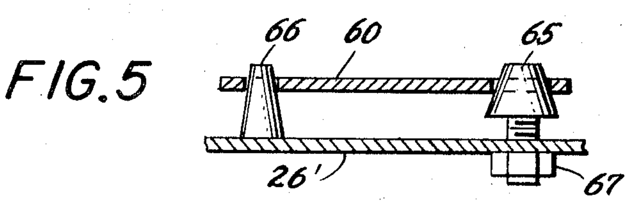
FIG. 5 is the sectional view taken along the line 5—5 of FIG. 3.

The reference position of the shift mechanism hereof is the preset spacing that tape 40 is maintained with respect to the chassis base 26′ adjacent cam 70. Towards this end a tape guide 75 is supported adjacent head 45, as shown in FIGS. 3 and 4. As heretofore noted FIG. 3, and thus FIG. 4, are as viewed from below the chassis interior; and so are turned about in operative use. Guide 75 consists of two fingers 76, 77 that project into an opening in the cartridge 17 and overlap the longitudinally moving tape 40. The lower finger 76 holds the bottom edge of tape 40 at the predetermined spacing with respect to base 26′, as it is simultaneously pressed against head 45 by pad 46. With tape 40 held in this steady fixed relation, the position of head 45 is initially factory or service adjusted, and in operation shifted by the invention system.

Precise position-adjustment of the head 45 with respect to the guide held tape 40 is accomplished through adjustable post 65 and pin 68. Conical post is the "azimuth" adjustment member. The azimuth pivot axis of head support 60 passes through post 66 and pin 68. Raising or lowering threaded post 65 causes a corresponding change in the angular setting of plate 60 and of head 45 with respect to the linear tracks on tape 40. Further, adjustment of cam follower pin 68 in plate 60 corrects for elevation of the head 45, and effects precise tracking position for the head. The elevation pivot axis is between end conical posts 65, 66. This presetting array is held steady and stabilized by spring 71.

Figure 6:
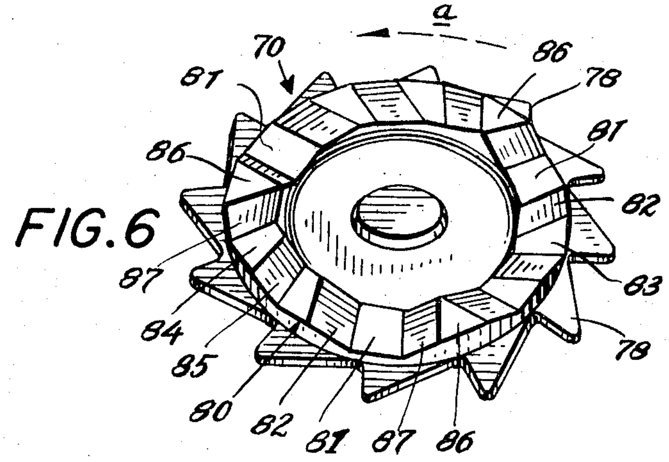
FIG. 6 is a perspective view of the stepped face cam of the exemplary shift mechanism.

The exemplary stepped face cam 70 is arranged to shift head 45 into four discrete track "heights" on tape 40. In practice, fewer or more successive steps may be provided, where desired or required. Further, cam 70 comprises three separate successive sets of four shift steps along its peripheral face 80, as seen in FIGS. 4 and 6. The lowest flat steps 81, 81 position head 45 at the lowest track (set) on tape 40. The pin 68 assures this. When the ratchet rim 78 of cam 70 is gripped by spring-pawl 79 to advance one step, in the direction of dotted arrow *a*, pin 68 rides up the adjacent ramp 82, 82 to flat step 83, 83. The third steps 84, 84 are reached through ramps 85, 85; the highest steps 86, 86 through ramps 87, 87.

The cam 70 is rotatably suppotred in base 26′ by post 89. The cam face 80 may contain only one or two step-sets. Its action is "endless" so that upon completion of one step-set the stepping action and sequence is repeated. The cam shifting herein is accomplished each time solenoid 58 is "pulsed" or activated through the circuit of FIG. 7. The battery 90 connects directly to solenoid 58 when either the feeler contacts 53, 54 are connected through the patch 56, as set forth above; or when the manual "track selector" button 25 (see FIG. 2) is pressed to close switch 91. When solenoid 58 is thus energized it attracts armature 92 that is pivoted at 93 against spring 94. As seen in FIG. 3, the spring-pawl 79, engaged with a ratchet tooth 78 rotates cam 70 to the next step position. Holding pawl 95 moves against the ratchet 78 as the solenoid remains unenergized, at the position shown in dotted lines.

The track shift mechanism of the present invention is particularly advantageous for players of cartridges with endless reels of tape. The direct shift of the pick-up head 45 with respect to the tape 40 is very rapid, and is readily effectuated through a conductive strip or marker only one inch in length at the start/end recording region of the tape. The recorded tracks are all parallel. Hence a very small lateral shift of the head 45 suffices to effect its pick-up or coaction on successive tracks. As the step-cam 70 is arranged to recycle the head shifting, automatic restart of the playback cycle is effectuated thereby. Means may be provided for the track shift action hereof to be selectively responsive to the stereo or monaural recordings per se, or to distinctive cartridges therefor, and actuate the step-shift system accordingly.

The manual track selector 25 action over-rides the automatic track shifting, resulting in a track shifting step by the cam 70 for each manual actuation in addition to those initiated by the start/end tape region. Rapid scanning and/or selection of recorded material across a two or four hour tape is readily performed through the manual selector. The direct precision action of the shift mechanism and system hereof has rendered practical the playback of 1/4" tape with at least eight tracks—even in rugged mobile operation.

Although the invention mechanism and system has been described in connection with an exemplary embodiment thereof, it is to be understood that it is subject to changes and modifications within the broader spirit and scope of the invention, as set forth in the following claims.

We claim:

1. A magnetic tape player for a cartridge containing a reel of tape in endless array with an exposed portion for coaction with the player, said player comprising a chassis, magnetic tape drive means including a capstan supported in the chassis and a magnetic tape transducer, said capstan and transducer being positioned at the interior end of a tunnel opening in the chassis; retention means biased into the tunnel opening for engaging a side notch of the cartridge directly upon its insertion therein and for exerting a forward force on the cartridge to press said tape portion into play relation with said transducer and into firm tape drive relation with said capstan; a stationary tape guide mounted on said chassis adjacent said transducer with a tape support section arranged to project into the inserted cartridge and beneath its said exposed tape portion whereby the lower edge of said tape portion moves over said support section and is maintained at a predetermined level in said chassis while the cartridge is engaged in the player; a displaceable member coupled to the transducer for positioning it with respect to a plurality of parallel record-tracks on the tape; cam means coatable with said member for controlling said transducer to play said record-tracks; said cam means having a plurality of successive regions spaced apart in correspondence with the record-tracks, said cam regions being constructed to displace said member to corresponding levels in said chassis when in individual coaction therewith and thereby position the transducer for play with associated record-tracks; means arranging said successive cam regions for automatically recycling the transducer in step-by-step scanning relation across the tape record-tracks and return, in endless configuration; and mechanism for shifting said cam means in single steps to position said transducer to successive record-track positions, said mechanism being responsive to the passage of the ending of each record-track in play to move the transducer into coaction with the successive record-track in continuous tape play relation.

2. A magnetic tape player as claimed in claim 1, in which said cam means contains a plurality of sets of said successive cam regions, said sets being arranged in seriatim to effect said step-by-step scanning and return of the transducer on a recycle basis, the effective spacing between each cam region within each set and between adjacent sets being substantially the same to effect tracking of said transducer with the parallel record-tracks in continuous play relation.

3. A magnetic tape player as claimed in claim 2, in which said sets of successive cam regions are arranged in circular array whereby turning of said array in equal angular arcs effects said step-by-step and recycling displacements of the transducer, the axis of said circular array being substantially parallel to the maintained orientation of said exposed tape portion and said cam regions being plane surfaces normal to said axis at their said corresponding levels.

References Cited

UNITED STATES PATENTS

| | | | |
|---|---|---|---|
| 3,083,269 | 3/1963 | Gaubert ---------- | 179—100.2 |
| 2,857,164 | 10/1958 | Camras. | |
| 2,468,198 | 4/1949 | Heller. | |
| 3,155,359 | 11/1964 | Hogan et al. | |
| 3,278,694 | 10/1966 | Pastor et al. | |
| 1,241,674 | 10/1917 | Sparks -------------- | 74—567 |

TERRELL W. FEARS, *Primary Examiner.*

J. RUSSELL GOUDEAU, *Assistant Examiner.*

U.S. Cl. X.R.

242—55.19; 274—11